United States Patent Office 3,631,199
Patented Dec. 28, 1971

3,631,199
POLYETHER DIISOCYANATES
Samuel Smith, Roseville, and Allen J. Hubin, White Bear Lake, Minn., assignors to Minnesota Mining and Manufacturing Company, St. Paul, Minn.
No Drawing. Continuation-in-part of application Ser. No. 527,399, Feb. 10, 1966, which is a continuation-in-part of application Ser. No. 290,218, June 24, 1963. This application Mar. 20, 1967, Ser. No. 624,197
Int. Cl. C07c 119/04; C08a 22/20, 22/44
U.S. Cl. 260—453 AL    7 Claims

ABSTRACT OF THE DISCLOSURE

A polyether diisocyante having the formula $$OCN(RO)_nRNCO$$

in which at least 60 percent of said R radicals are tetramethylene, the remainder being another alkylene radical having from 2 to 6 carbon atoms and $n$ is an integer from about 3 to about 3000. These polyether diisocyanates may be used in chain extension and curing reactions with co-reactants containing active hydrogen, and elastomers having high tensile strength and elongation can be produced.

---

This application is a continuation-in-part of United States patent application Ser. No. 527,399, filed Feb. 10, 1966, which is a continuation-in-part of United States patent application Ser. No. 290,218, filed June 24, 1963, now abandoned.

This invention relates to novel polymeric polyisocyanates and derivatives thereof. In one preferred aspect this invention relates to polyether polyisocyanates, particularly polytetrahydrofuran polyisocyonates, their reactions and derivatives.

Isocyanate terminated polymers have found considerable use as reactive prepolymers in chain extension or curing reactions, where their reaction with materials having active hydrogen provides a convenient route for the preparation of adhesives, sealants, impegnants, plastics, binders, casting resins, elastomers, foams, spandex fibers, etc. and for treating various active hydrogen containing materials, such as leather. It will therefore be unnecessary to enumerate all of the known reactions and uses of isocyanate containing polymers. Among the more valuable isocyanate terminated polymers are the polyether polyisocyanates prepared by the reaction of one mol of a polyether glycol with more than one mol of an arylene or alkylene diisocyanate. To minimize chain extension which may occur as a side reaction, at least two mols of the diisocyanate is usually employed, any excess or unreacted diisocyanate remaining in the product. If an excess of a volatile diisocyanate is used, a serious toxicity problem is generally presented. Furthermore, the preparation of polyether diisocyanates by reacting a polyether glycol with an organic diisocyanate introduces urethane groups into the main chain. Such urethane groups, because of their tendency to form intermolecular complexes by hydrogen bonding, undesirably increase the viscosity of the product. Low viscosity is generally preferred for self-leveling, flowing and mixing characteristics, particularly in resin formulations which use little or no diluent.

It is therefore an object of this invention to provide polyether diisocyanates having no urethane groups in the main polymer chain.

Still another object of this invention is to provide polyether diisocyanates having properties of aliphatic diisocyanates.

A further object of this invention is to provide a polyether diisocyanate with a high degree of difunctionality, specifically diisocyanate functionality.

Other objects and advantages will become apparent from the following disclosure.

The polyether diisocyanates of this invention have the formula $$OCN(RO)_nRNCO$$

in which R is an alkylene (including substituted alkylene) radical having from 2 to 6 chain carbon atoms, at least 60 percent of said R radicals being preferably tetramethylene and $n$ is an integer from about 3 to about 3,000, preferably from about 5 to about 300, the molecular weight being between about 350 about 200,000, preferably from about 500 to about 20,000. In a preferred embodiment these polyether diisocyanates are further characterized by a high degree of terminal isocyanate functionality, i.e. at least 90% of the terminal groups are isocyanate. Like other aliphatic diisocyanates, they are less reactive than aromatic diisocyanates and are accordingly useful in mixtures of resin and curing agent when increased pot life is desired (i.e., when slower curing rates are desired). Chain extended and cured products derived therefrom have better resistance to discoloration, particularly after sunlight exposure, than analogous products derived from aromatic diisocyanates.

The polyether diisocyanates of this invention may be prepared by reacting a polyether dication (i.e. terminally dicationically active polyether) with a cyanate salt. A wide range of temperatures (e.g. from about −20° C. to about 70° C.), inert diluents (i.e. diluents which are free of active hydrogen atoms and which do not contain nucleophilic groups) such as cyclohexane, cyanate salts (e.g. cyanates of lithium, soidum, potassium, cesium, silver, amomnium, tetramethyl amomnium, etc.) and reactant ratios (e.g. from 1 to 10 or more equivalents of cyanate salt per cationically active end of the polyether) may be employed in the reaction. In general, however, it is convenient to operate in the temperature range from 0° C. to 60° C., using 1 to 5 equivalents of a finely divided, alkali metal cyanate salt per equivalent of cationically active end of the polyether and from 0 to 25 weight percent of inert diluent. To illustrate the reaction conditions when no inert diluent is used, the reaction apepars to be complete within 40 minutes at a temperature of 50° C. when one uses 3 equivalents of potassium cyanate per equivalent of cationically active end of the polyether. Removal of the unreacted cyanate salt, such as potassium cyanate which is insoluble in the product, may be readily accomplished by centrifugation or filtration.

In the above reaction the polyether dication is a non-terminated or "living" polyether having two cationally active ends of the polyether chain. Such polyether dications and their preparation is desicrebed in U.S. patent application Ser. No. 527,399, the disclosure of which is incorporated herein by reference. The polyether contains recurring units corresponding to tetahydrofuan (i.e. tetramethylene oxide) as its predominant constituent and may also contain up to about 40 mol percent of recurring units corresponding to another acid polymerizable (i.e. cationically polymerizable) cyclic ether, such as propylene oxide, 2-methyl tetrahydrofuran, 8-oxa-bicyclo(4,3,0)nonane, etc. A polyether dication comprising recurring units of tetramethylene oxide and from about 5 to 20 mol percent of units corresponding to propylene oxide (i.e. 1,2-propylene oxide) or 2-methyl tetrahydrofuran (i.e. 1,4-pentylene oxide) in the polyether dication molecular weight range of 400 to 5000 may be preferred to provide a polymer with a lower melting point, usually a liquid at room temperature.

The unique polyether diisocyanates can be used as reactive prepolymers in adhesives, coatings, sealants, binders and casting compositions, as well as in the production of elastomers, foams, spandex fibers, and block copolymers by addition reactions. They may be used generally as a partial or total substitute for aliphatic or aromatic diisocyanates. In chain extension or curing reactions they may be reacted with a compound having at least two active hydrogen atoms per molecule, e.g. water, glycols (such as ethylene glycol, propylene glycol, polyoxyethylene glycol, polyoxypropylene glycol, polyethylene adipate, glycols, etc.), polyols (such as glycerine, trimethylol propane, pentaerythritol, sorbitol, polyoxypropylene triol, etc.), hydrazine, diamines (such as ethylene diamine, hexamethylene diamine, m-phenylene diamine, bis(4-aminophenyl)methane, bis(3 - chloro-4-aminophenyl)methane, etc.), polyamines (such as diethylene triamine, triethylene tetramine, etc.), dithols (such as ethane dithiol), and amino alcohols (such as ethanolamine). Additional di- or poly-isocyanates may be employed in these reactions in addition to the polyether diisocyanates of this invention, thus permitting even greater versatility. Chain extension and curing reaction can be carried out by well known techniques and may involve the use of catalysts such as tertiary amines and salts of heavy metals. When used in the preparation of elastomeric polyether ureas, polyether thiourethanes and polyether urethanes the high degree of isocyanate functionality, mentioned earlier, is important to obtain a combination of high tensile strength and high elongation in the products.

Because the polyether diisocyanates of this invention have relatively low viscosities in contrast to presently available polymeric diisocyanates containing urethane groups, they are uniquely capable of use for many purposes without diluents or viscosity reducing additives and may, for example, eliminate the need for solvent removal.

The following examples will serve to illustrate the invention.

EXAMPLE 1

This example illustrates the preparation of poly(tetramethylene oxide) α,ω-diisocyanate wherein the terminal isocyanate groups are bonded directly to the polyether backbone.

(A) 200 ml. of tetrahydrofuran was distilled from LiAlH₄ directly into the reaction vessel, a 500-ml. three-neck round bottom flask equipped with stirrer, thermometer and nitrogen gas inlet and outlet ports. 9.2 ml. of $(CF_3SO_2)_2O$ was added to the well-stirred tetrahydrofuran. The resulting exotherm was allowed to carry the temperature to 50° C., where it was held for 10 minutes. Throughout both the polymerization and termination steps the reactants were protected from moisture by a stream of nitrogen. 28 g. of highly purified, powdered potassium cyanate was added to the viscous solution containing dicationically active polytetrahydrofuran. An exothermic reaction took place. The reaction rate and extent of completion of this termination reaction, which served to append the terminal isocyanate groups directly to the bone, were followed by infrared spectroscopy over the course of 90 minutes at 50° C. It was found that termination was a relatively rapid reaction, apparently being complete in 40 minutes at 50° C. The product was centrifuged to remove most of the dispersed solids. The polymer was then taken up in cyclohexane, centrifuged to clarity, and the solvent removed.

The resulting clear, essentially colorless polytetrahydrofuran α,ω-diisocyanate, obtained in 45% yield was characterized analytically as follows: isocyanate equivalent weight by titration=1140; number average molecular weight by vapor pressure osmometry=2255; strong infrared absorption at 4.4µ (characteristic of the isocyanate group). Its very good fluidity at room temperature was clearly indicated by a viscosity of 6300 centipoises. The inherent viscosity at a concentration of 1.139 grams per 100 ml. of dimethylformamide was 0.13 at 25° C.

(B) The equimolar reaction of 0.116 g. of 1,6-hexanediamine with 2.28 g. of the above polytetrahydrofuran diisocyanate in 70 g. of tetrahydrofuran at room temperature yielded a tough elastomeric, clear, colorless polyether-urea. Infrared spectroscopic analysis of the polymer indicated the absence of NCO groups and the presence of N—H and urea linkages. A film of the polymer, cast from dimethylformamide, exhibited excellent color stability when exposed to ultraviolet light. No discoloration was noted after the film was exposed to ultraviolet light for 20 hours in a Weather-O-meter. A control elastomeric film made by reaction of the known prepolymer

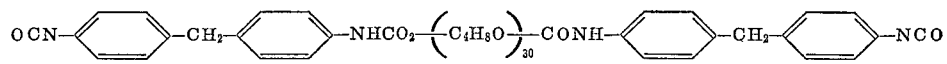

with a stoichiometric concentration of 3,3'-dichloro-4,4'-diaminodiphenylmethane turned brown when exposed to ultraviolet light under identical conditions.

(C) 2.67 g. of 3,3'-dichloro-4,4'-diaminodiphenylmethane was dissolved in 20 ml. of toluene and added to 22.8 g. of the above polytetrahydrofuran diisocyanate dissolved in 23 g. of cyclohexane. The solution was immediately poured into a centrifugal cup film caster and cured at 40° C. for 16 hours, then post cured for 24 hours at 75° C. The film was transparent and almost colorless and had a tensile strength of 3220 p.s.i. and an ultimate elongation of 790%.

EXAMPLE 2

Essentially similar results as in Example 1A were obtained when highly pure LiOCN instead of KOCN was used to terminate polymerization. Operating as in 1A above, 200 ml. of purified tetrahydrofuran was polymerized at 50° C. for 10 minutes with 9.2 ml. of $$(CF_3SO_2)_2O$$

catalyst. 17 g. of LiOCN was then added, and an exothermal reaction resulted, suggestive of rapid termination of polymerization. By again following the reaction rate and extent of completion of the termination reaction by spectroscopy, it was confirmed that the isocyanate termination reaction proceeded rapidly and essentially to completion within a few minutes at 50° C. After removal of excess LiOCN and catalyst residues, a colorless, fluid polytetrahydrofuran α,ω-diisocyanate was obtained in 45% yield, which showed a strong infrared absorption band for isocyanate at 4.4 microns. The isocyanate equivalent weight was 1330.

EXAMPLE 3

(A) Using the same procedure as outlined in Example 1, 200 ml. of purified tetrahydrofuran was polymerized at 50° C. for 10 minutes with 4.6 ml. of $(CF_3SO_2)_2O$. 18 g. of finely powdered KOCN was added and the mixture allowed to stir at 50° C. for 40 minutes. The salts were removed as previously described, yielding 50 g. of polytetrahydrofuran diisocyanate. Analytical analysis indicated that the polymer had a number average molecular weight of 6200 and an isocyanate equivalent weight of 3270.

(B) 16.4 g. of polytetrahydrofuran diisocyanate of part A was dissolved in 20 g. of cyclohexane and added to 0.09 g. of 1.4 butanediol and 0.12 g. of trimethylol propane dissolved in 20 g. of a 50/50 toluene/tetrahydrofuran solvent mixture. A catalytic amount of stannous octoate was added an a film was cast and cured at 40° C. for 16 hours, then post cured at 90° C. for 24 hours. The elastomeric polyether-urethane film was transparent and colorless. Tensile at break was 1100 p.s.i. and ultimate elongation was 780%.

(C) 16.4 g. of the polytetrahydrofuran diisocyanate of part A was dissolved in 16 g. of toluene and added to 0.67 g. of 3,3′-dichloro-4,4′-diaminodiphenylmethane dissolved in 20 g. of toluene. The solution was immediately poured into a centrifugal cup film caster and cured at 40° C. for 16 hours, then post cured 24 hours at 90° C. The polyether-urea film was transparent and almost colorless and had a tensile at break of 1030 p.s.i. and an ultimate elongation of 775%.

EXAMPLE 4

(A) 200 ml. of tetrahydrofuran was distilled from LiAlH$_4$ into a 500 ml. three-neck round bottom flask equipped with stirrer, thermometer and argon inlet and uolet ports. After cooling the well-stirred tetrahydrofuran to 10° C., 10.7 ml. of $(CF_3SO_2)_2O$ was added. The resulting exotherm was allowed to raise the temperature to 40° C. where it was held for 15 minutes. A stream of argon was used to protect the reactants from oisture. 31 g. of finely powdered KOCN was added and the mixture stirred vigorously at 40° C. for 55 minutes. The product was diluted with 200 ml. of cyclohexane and filtered to remove the dispersed solids. The resulting clear, essentially colorless polytetrahydrofuran diisocyanate, obtained in 41% yield, was characterized analytically as follows: isocyanate equivalent weight by titration=1440; number average molecular weight by vapor pressure osmometry= 3180.

(B) 28.80 g. of the polytetrahydrofuran of part A diisocyanate was added to 2.67 g. of 3,3′-dichloro-4,4′-diaminodiphenylmethane dissolved in 20 ml. of toluene. A film was cured in a centrifugal cup film caster at 40° C. for 16 hours, then post cured at 75° C. for 8 hours. The film was a tough, clear elatomeric polyether-urea. Tensile at break was 3260 p.s.i. and the ultimate elongation was 830%.

EXAMPLE 5

100 ml. of anhydrous tetrahydrofuran was placed in a 250 ml. round bottom flask equipped with a stirrer and drying tube. Ten milliliters of trifluoromethane sulfonic anhydride was added at room temperature. An exotherm and viscosity increase were noted. A few minutes after anhydride addition 26 g. of potassium cyanate was added to the dicationically active polymer. Vigorous stirring was maintained at room temperature over a week-end. During the latter part of this period, however, the reactants gelled. The product was then shaken with benzene, and a soluble and an insoluble portion were found. Both portions exhibited fairly strong alkyl isocyanate absorption bands in the infrared (4.4 microns; potassium cyanate absorbs at 4.6 microns). The soluble material was rendered insoluble by almost instantaneous reaction at 25° C. with hexamethylene diamine, and the resulting insoluble material showed no isocyanate absorption in the infrared, indicating complete formation of the urea.

EXAMPLE 6

(A) 150 ml. of tetrahydrofuran and 60 ml. of 2-methyl tetrahydrofuran were separately distilled from LiAlH$_4$ into a three-neck 500 ml. flask equipped with a stirrer, thermometer, and inert gas inlet and outlet valves. After cooling the well-stirred mixture to 0° C., 10.7 ml. of $(CF_3SO_2)_2O$ was added. Polymerization was run at 5° C. for 40 minutes under an argon atmosphere. 31 g. of finely powdered, high purity potassium cyanate was added and the mixture stirred vigorously for 45 minutes at 5° C. and 60 minutes at 25° C. 150 ml. of cyclohexane was added and the mixture filtered to remove the excess KOCN and KSO$_3$CF$_3$ salts. The tetrahydrofuran solvent was removed by vacuum stripping, and the polymer was centrifuged to remove any remaining impurities. The remaining cyclohexane solvent was then removed by vacuum stripping. An essentially clear liquid polyether diisocyanate was obtained. Conversion to polymer was 55%.

Infrared analysis of the polymer indicated a strong isocyanate absorption band at 4.4 microns. The isocyanate equivalent weight as determined by titration was 1480, and the number average molecular weight was 2680 (by osmometry). Bulk viscosity was 3600 centipoise.

(B) 2.67 g. of 3,3′-dichloro-4,4′-diaminodiphenylmethane was dissolved in 20 g. of toluene and the solution was mixed with 29.60 g. of the above polyether diisocyanate. A cast film was first cured at 25° C. for 16 hours, then at 100° C. for 8 hours. The film was transparent and almost colorless and had a tensile strength at break of 1640 p.s.i. and an ultimate elongation of 1140%.

What is claimed is:

1. A polyether isocyanate composition in which at least 90% of said polyether terminal groups are isocyanate, said polyether isocyanate consisting predominantly of polyether diisocyanate of the formula

OCN(RO)$_n$RNCO in which at least 60 percent of said R radicals are tetramethylene, the remainder being another alkylene radical having from 2 to 6 carbon atoms and n is an integer from about 3 to about 3000.

2. The polyester diisocyanate of claim 1 in which the molecular weight is between about 350 and about 200,000.

3. The polyether diisocyanate of claim 1 in which said alkylene radical having from 2 to 6 carbon atoms is 1,4-pentylene.

4. The polyether diisocyanate of claim 1 in which said alkylene radical having from 2 to 6 carbon atoms is 1,2-propylene.

5. The polyether diisocyanate of claim 1 in which all of said R radicals are tetramethylene.

6. The polyether diisocyanate of claim 1 in which from 80 to 95 percent of said R radicals are tetramethylene and from 5 to 20 percent of said R radicals are 1,4-pentylene.

7. The polyether diisocyanate of claim 1 in which from 80 to 95 percent of said R radicals are tetramethylene and from 5 to 20 percent of said R radicals are 1,2-propylene.

References Cited

UNITED STATES PATENTS 3,370,077  2/1968  Hartzell _____ 260—453
3,044,989  7/1962  Shivers, Jr. _____ 260—77.5

CHARLES B. PARKER, Primary Examiner

D. H. TORRENCE, Assistant Examiner

U.S. Cl. X.R.

260—2.5 AT, 77.5 AT, 453 P, 471 C, 482 B, 615 B

UNITED STATES PATENT OFFICE
CERTIFICATE OF CORRECTION

Patent No. 3,631,199              Dated December 28, 1971

Inventor(s) SAMUEL SMITH and ALLEN J. HUBIN

It is certified that error appears in the above-identified patent and that said Letters Patent are hereby corrected as shown below:

Column 2, line 15, "about 350 about" should be --about 350 and about--;

Column 2, line 58, "tetahydrofuan" should be --tetrahydrofuran--;

Column 3, line 66, --polytetrahydrofuran back-- were omitted and should be inserted before "bone";

Column 5, line 18, "uolet" should be --outlet--;

Column 5, line 22, "oisture" should be --moisture--.

Signed and sealed this 19th day of December 1972.

(SEAL)
Attest:

EDWARD M. FLETCHER, JR.              ROBERT GOTTSCHALK
Attesting Officer                     Commissioner of Patents